(12) United States Patent
Lee et al.

(10) Patent No.: US 9,187,677 B2
(45) Date of Patent: Nov. 17, 2015

(54) AQUEOUS ADHESIVE COMPOSITION THAT CHANGES LITTLE OVER TIME

(71) Applicant: LG Hausys, Ltd., Seoul (KR)

(72) Inventors: Han Na Lee, Ansan-si (KR); Jae Gwan Lee, Daejeon (KR); Jang Soon Kim, Seongnam-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/345,181

(22) PCT Filed: Oct. 5, 2012

(86) PCT No.: PCT/KR2012/008064
§ 371 (c)(1),
(2) Date: Mar. 14, 2014

(87) PCT Pub. No.: WO2013/051876
PCT Pub. Date: Apr. 11, 2013

(65) Prior Publication Data
US 2014/0350165 A1    Nov. 27, 2014

(30) Foreign Application Priority Data
Oct. 5, 2011   (KR) .................. 10-2011-0101212

(51) Int. Cl.
| | | |
|---|---|---|
| *C08L 33/06* | (2006.01) | |
| *C08G 18/08* | (2006.01) | |
| *C09J 4/06* | (2006.01) | |
| *C09J 7/02* | (2006.01) | |
| *C09J 4/00* | (2006.01) | |
| *C09J 133/08* | (2006.01) | |
| *C08F 220/18* | (2006.01) | |
| *C08F 220/20* | (2006.01) | |

(52) U.S. Cl.
CPC ..... *C09J 4/06* (2013.01); *C09J 4/00* (2013.01); *C09J 7/02* (2013.01); *C09J 133/08* (2013.01); *C08F 220/18* (2013.01); *C08F 220/20* (2013.01)

(58) Field of Classification Search
CPC ...................................... C09J 4/06; C09J 4/00
USPC ......................................................... 524/560
See application file for complete search history.

(56) References Cited

U.S. PATENT DOCUMENTS

| | | |
|---|---|---|
| 2001/0037006 A1 | 11/2001 | Holguin |
| 2003/0017331 A1 | 1/2003 | Okochi et al. |
| 2008/0234425 A1* | 9/2008 | Harris et al. .................. 524/500 |

FOREIGN PATENT DOCUMENTS

| | | | |
|---|---|---|---|
| CN | 1612921 A | 5/2005 | |
| CN | 102060954 A | 5/2011 | |
| GB | 2417248 A | 2/2006 | |
| JP | 2006169428 A | 6/2006 | |
| KR | 100177541 B1 | 4/1999 | |
| KR | 20040039811 A | 5/2004 | |
| KR | 1020040039811 * | 5/2004 | .............. C09J 133/10 |
| KR | 20050049427 A | 5/2005 | |
| TW | 200407413 A | 5/2004 | |
| WO | 9824825 A1 | 6/1998 | |
| WO | 2011009800 A1 | 1/2011 | |
| WO | 2012115642 A1 | 8/2012 | |

OTHER PUBLICATIONS

Translation of KR1020040039811, May 12, 2004.*
International Search Report mailed on Mar. 26, 2013 for PCT/KR2012/008064.
Chinese Office Action dated Nov. 15, 2014.
Extended European Search Report dated Feb. 23, 2015.
Chinese Office Action dated Jul. 9, 2015 in connection with the counterpart Chinese Patent Application No. 201280048939.4, citing the above reference(s).

* cited by examiner

*Primary Examiner* — Hui Chin
(74) *Attorney, Agent, or Firm* — Hauptman Ham, LLP

(57) ABSTRACT

Disclosed is an aqueous adhesive composition, the adhesive properties of which are barely degraded due to aging. The aqueous adhesive composition according to the present invention has the technical features of comprising a monomer having a hydroxyl group, and of not forming a chelate compound after polymerization. Thus, the aqueous adhesive composition has the advantages of having little reduction in adhesive properties thereof due to an increase in gel content.

2 Claims, 1 Drawing Sheet

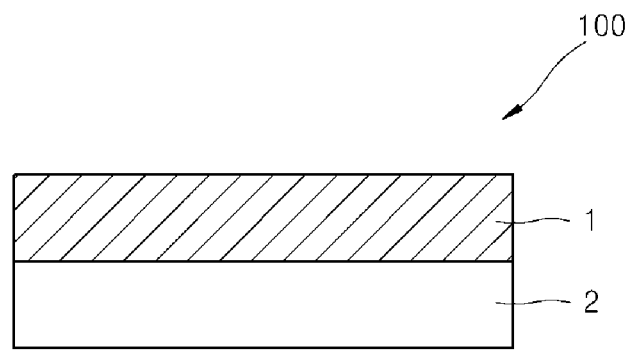

AQUEOUS ADHESIVE COMPOSITION THAT CHANGES LITTLE OVER TIME

CROSS REFERENCE TO RELATED APPLICATION

This application claims the priority of Korean Patent Application No. 10-2011-0101212 filed on Oct. 5, 2011 in the Korean Patent and Trademark Office. Further, this application is the National Phase application of International Application No. PCT/KR2012/008064 filed on Oct. 5, 2012, which is incorporated herein by reference in its entirety.

TECHNICAL FIELD

The present invention relates to an aqueous adhesive composition, and more particularly, to an aqueous adhesive composition which exhibits substantially no reduction in adhesion due to increase in gel content of an adhesive.

BACKGROUND ART

Currently, most adhesives generally used in adhesive tapes, labels and the like are solvent type adhesives and discharge volatile organic compounds (VOCs). Thus, recently, development from solvent type adhesives to aqueous adhesives has been made to satisfy tightened environmental regulations.

Techniques related to an aqueous adhesive composition are disclosed in documents, such as Korean Patent Publication No. 10-017741 and the like. An aqueous adhesive prepared through emulsion polymerization in the art typically uses acrylic acid as a functional monomer in order to impart high peel strength and cohesion. Use of acrylic acid in the aqueous adhesive composition enables impartment of high adhesion regardless of types of adherends. However, such acrylic acid reacts with ionic impurities included in initiators, emulsifiers, neutralizers and thickeners to form a chelate after polymerization. Such a chelate increases gel content, causing increase in hardness and reduction in adhesion of adhesives.

As described above, to prevent formation of the chelate due to the acrylic acid and ionic impurities, low-ionic emulsion polymerization may be performed. However, emulsion polymerization using a minimum amount of nonionic chemicals has a problem of deterioration in productivity due to deterioration in polymerization stability and generation of agglomerates. In addition, there is a problem in that defects are generated in a finally prepared adhesive coating layer.

To solve such problems, there is a need for an aqueous adhesive composition which is not affected by ionic impurities used in emulsion polymerization.

DISCLOSURE

Technical Problem

The present invention has been conceived to solve such problems in the art, and it is an aspect of the present invention to provide an aqueous adhesive composition which suppresses formation of a chelate caused by acrylic acid and ionic impurities and thus minimizes change of properties, such as peel strength and the like, over time.

Technical Solution

In accordance with an aspect of the present invention, an aqueous adhesive composition includes a hydroxyl group-containing monomer and does not form a chelate after polymerization.

Advantageous Effects

According to the invention, since the aqueous adhesive composition includes a hydroxyl group-containing monomer and does not use acrylic acid substances, the aqueous adhesive composition does not form a chelate after polymerization. Thus, an adhesive sheet produced from the aqueous adhesive composition according to the invention suffers from substantially no reduction of adhesion due to increase in gel content.

DESCRIPTION OF DRAWINGS

FIG. 1 is a sectional view of an adhesive sheet according to one embodiment of the present invention.

BEST MODE

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and a thorough understanding of the present invention by those skilled in the art. The scope of the present invention is defined only by the claims. Like components will be denoted by like reference numerals throughout the specification.

Hereinafter, an aqueous adhesive composition according to embodiments of the invention will be described in detail with reference to the accompanying drawings.

FIG. 1 shows an adhesive sheet according to one embodiment of the present invention. First, the aqueous adhesive composition according to the invention will be described in detail.

Aqueous Adhesive Composition

According to the invention, an aqueous adhesive composition includes a hydroxyl group-containing monomer and does not form a chelate after polymerization.

Since the aqueous adhesive composition uses a hydroxyl group-containing monomer as a polymerization monomer instead of acrylic acid, the aqueous adhesive composition does not form a chelate after emulsion polymerization.

Thus, the aqueous adhesive composition can minimize problems due to deterioration in adhesion caused by the chelate.

The hydroxyl group-containing monomer included in the aqueous adhesive composition may be any monomer without limitation so long as the monomer does not form a chelate in conjunction with ionic impurities generated after polymerization of the aqueous adhesive composition and includes a hydroxyl group as a functional group. For example, the hydroxyl group-containing monomer may include at least one selected from the group consisting of hydroxyethyl acrylate, hydroxyethyl methacrylate, hydroxypropyl acrylate, and hydroxybutyl acrylate.

In addition, the aqueous adhesive composition may further include a soft monomer and a hard monomer.

The soft monomer may be used to impart initial adhesion of the aqueous adhesive composition. The soft monomer may include at least one selected from the group consisting of butyl acrylate, ethyl acrylate, 2-hydroxyethyl acrylate, isobutyl acrylate, 2-ethylbutyl acrylate, hexyl acrylate, heptyl acrylate, lauryl methacrylate, n-pentyl acrylate, and 2-ethylhexyl acrylate.

The hard monomer may be used for cohesion and adhesion of the aqueous adhesive composition. The hard monomer may include at least one selected from the group consisting of methyl acrylate, methyl methacrylate, ethyl methacrylate, n-butyl methacrylate, isobutyl methacrylate, t-butyl acrylate, and 2-ethylhexyl methacrylate.

The aqueous adhesive composition may further include an initiator, an emulsifier, and a thickener.

The initiator is used to initiate polymerization of the aqueous adhesive composition without limitation. For example, the initiator may include at least one selected from the group consisting of potassium persulfate (KPS), ammonium persulfate (APS), sodium persulfate (SPS), azoisobutyronitrile (AIBN), and benzoyl peroxide (BPO).

The emulsifier may be any emulsifier so long as the emulsifier is used for emulsion polymerization and known in the art. For example, the emulsifier may include at least one of anionic surfactants such as sodium dodecyl sulfate and sodium dodecyl benzene sulfonate, nonionic surfactants such as polyoxyethylene nonylphenyl ether, reactive nonionic surfactants such as 2-POE-3-alkoxy-1-propyl allyl ether, reactive anionic surfactants known in the art, and the like.

The thickener imparts adhesion to a reactant forming the aqueous adhesive composition, and may be any thickener known in the art. For example, the thickener may be a nonionic urethane thickener.

A commercially available example of the nonionic urethane thickener may include UH-420 (Adeka Co., Ltd.).

Adhesive Sheet Using Aqueous Adhesive Composition

Referring to FIG. 1, an adhesive sheet 100 according to the invention includes a coating layer 1 including the aqueous composition, and a release film 2.

In the adhesive sheet 100, the coating layer 1 is formed by coating the aqueous composition according to the invention onto one or both surfaces of the release film 2. Specifically, the aqueous composition is coated onto the surface of the release film 2, followed by drying, thereby preparing the adhesive sheet 100 including the coating layer 1.

The coating layer 1 is formed of the aqueous composition according to the invention, and details there are the same as described above.

The coating layer 1 may be formed on an upper surface of the release film 2. The release film 2 may be any film without limitation so long as the film allows the coating layer 1 to be easily peeled off without residual adhesive materials when the coating layer 1 including the aqueous composition according to the invention is peeled off.

For example, the release film 2 may be a polyethylene terephthalate film coated with a silicone release agent.

Hereinafter, the present invention will be explained in more detail with reference to some examples. It should be understood that these examples are not to be in any way construed as limiting the present invention.

<EXAMPLES>

Example 1

In a 1 glass reactor provided with a thermometer, a stirrer, a dropping funnel, a nitrogen introducing tube and a reflux condenser, about 18 parts by weight of ultrapure water, and about 0.10 parts by weight of ammonium persulfate were placed based on 100 parts by weight of total reactants, and the reactor was maintained at 80° C. In a separate container, 55 parts by weight of butyl acrylate (BA), 25 parts by weight of methyl acrylate (MA), 20 parts by weight of 2-hydroxyethyl acrylate (HEA), 0.12 parts by weight of n-dodecyl mercaptan (n-DDM), and 0.3 parts by weight of ethylene glycol dimethacrylate (EGDMA) were placed based on 100 parts by weight of total monomers, and about 28 parts by weight of ultrapure water, about 0.5 parts by weight of ammonium persulfate, an appropriate amount of a thickener UH-420 (Adeka Co., Ltd.), and 0.5 parts by weight of a mixture prepared as an emulsifier by mixing an anionic emulsifier sodium dodecyl sulfate (SDS) and a nonionic emulsifier ER-10 (Adeka Co., Ltd, Japan) in a ratio of 7:3 were placed based on 100 parts by weight of the total reactants, followed by polymerization, thereby preparing pre-emulsion.

A predetermined amount of the pre-emulsion was added to the reactor using the dropping funnel, followed by dropwise addition at the same rate for about 3 hours while maintaining a stiffing speed. After completion of dropwise addition, the mixture was subjected to aging for 2 hours, followed by additionally introducing predetermined amounts of t-butyl hydroperoxide and rongalite (sodium formaldehyde sulfoxylate) which are oxidoreductive catalysts into the reactor, thereby performing reaction for 1 hour. After completion of reaction, the resulting material was cooled to room temperature. Next, the resulting material was neutralized with an ammonia aqueous solution of a concentration of 28%, thereby adjusting a pH of the resulting material to 7 to 8.

Through the above processes, an aqueous adhesive composition of Example 1 was prepared.

Comparative Example 1

An aqueous adhesive composition of Comparative Example 1 was prepared in the same manner as in Example 1 except that 55 parts by weight of butyl acrylate (BA), 35 parts by weight of methyl acrylate (MA), and 10 parts by weight of acrylic acid (AA) were used, a mixture prepared by mixing the anionic emulsifier sodium dodecyl sulfate (SDS) and the nonionic emulsifier ER-10 in a ratio of 6:4 was used as the emulsifier, and the thickener was not used.

Comparative Example 2

An aqueous adhesive composition of Comparative Example 2 was prepared in the same manner as in Comparative Example 1 except that a mixture prepared by mixing the anionic emulsifier sodium dodecyl sulfate (SDS) and the nonionic emulsifier ER-10 in a ratio of 2:8 was used as the emulsifier.

<Evaluation>

1. Peel Strength

Each of the aqueous adhesive compositions prepared in Example and Comparative Examples was coated onto a PET release film to a thickness of 30 µm. The prepared adhesive sheet was attached to a SUS substrate. After 30 minutes, peel strength was measured at a speed of 300 mm/min.

In addition, the prepared sample was left in an oven at 50° C. for 3 days, and then attached to the SUS substrate as in the above, followed by measuring peel strength at a speed of 300 mm/min.

2. Gel Content

To observe increase in gel content of an adhesive itself, each of the aqueous adhesive compositions according to Example and Comparative Examples was coated onto a PET release film, followed by separating only the adhesive coating layer, thereby measuring gel content. In addition, gel content was also measured on the adhesive coating layer after the sample was left in an oven at 50° C. for 3 days.

3. Ion Content

A sample of each of the aqueous adhesive compositions according to Example and Comparative Examples were taken, followed by drying. Then, ion content of the sample was measured using ICP.

In this experimental example, initial peel strength and gel content were measured on each of the aqueous adhesive compositions according to Example and Comparative Examples, followed by measuring peel strength and gel content after the sample was left at 50° C. for 3 days, thereby observing whether property change of the aqueous adhesive occurred over time.

Experimental results of peel strength, gel content and ion content of the aqueous adhesive compositions according to Example and Comparative Examples are shown in Table 1.

TABLE 1

| | Ion content (ppm) | Peel strength (g/in) | | Gel content (%) | |
|---|---|---|---|---|---|
| | | Initial peel strength | Peel strength after being left in oven at 50° C. for 3 days | Initial gel content | Gel content after being left in oven at 50° C. for 3 days |
| Example 1 | 1500 | 1800 | 1850 | 0 | 0 |
| Comparative Example 1 | 1000 | 2500 | 1250 | 45 | 64 |
| Comparative Example 2 | 100 | 2200 | 1450 | 25 | 41 |

As shown in Table 1, it could be seen that the aqueous adhesive compositions of Comparative Examples 1 and 2 using acrylic acid exhibited deterioration in peel strength due to increase in gel content of the adhesive sheet itself after the adhesive sheet was left at high temperature despite low ion content in the aqueous adhesive.

Conversely, in the case of the aqueous adhesive composition of Example 1 not using acrylic acid, it could be seen that there was no increase in gel content of the adhesive sheet even after the adhesive sheet was left at high temperature, and that the aqueous adhesive composition of Example 1 did not suffer from deterioration in peel strength.

That is, since the aqueous adhesive composition according to the invention includes a hydroxyl group-containing monomer instead of acrylic acid and thus does not form a chelate after polymerization, the aqueous adhesive composition exhibits small property change over time, such as deterioration in peeling strength.

Although the present invention has been described with reference to some embodiments in conjunction with the accompanying drawings, it should be understood that various modifications, changes, alterations, and equivalent embodiments can be made by those skilled in the art without departing from the spirit and scope of the invention. Therefore, the scope and sprit of the present invention should be defined only by the accompanying claims and equivalents thereof.

The invention claimed is:

1. An aqueous adhesive composition comprising:
hydroxyethyl acrylate,
butyl acrylate,
methyl acrylate,
an initiator;
an emulsifier; and
a thickener;
wherein the aqueous adhesive composition does not form a chelate with the initiator, emulsifier, or thickener after polymerization, and with the proviso that the adhesive composition does not comprise acrylic acid.

2. The aqueous adhesive composition of claim 1, further comprising sodium dodecyl sulfate.

* * * * *